(12) United States Patent
Wilsher et al.

(10) Patent No.: US 10,212,304 B2
(45) Date of Patent: Feb. 19, 2019

(54) DOCUMENT SCANNER

(71) Applicant: Xerox Corporation, Norwalk, CT (US)

(72) Inventors: Michael John Wilsher, Letchworth (GB); Sebastián Rodrigo de Echaniz, Milton Keynes (GB); Paul Simon Golding, Cheshunt (GB); Benjamin Thomas Thurnell, Cheshunt (GB)

(73) Assignee: XEROX CORPORATION, Norwalk, CT (US)

( * ) Notice: Subject to any disclaimer, the term of this patent is extended or adjusted under 35 U.S.C. 154(b) by 52 days.

(21) Appl. No.: 15/407,610

(22) Filed: Jan. 17, 2017

(65) Prior Publication Data

US 2018/0205845 A1 Jul. 19, 2018

(51) Int. Cl.
*H04N 1/04* (2006.01)
*H04N 1/12* (2006.01)

(52) U.S. Cl.
CPC .......... *H04N 1/0464* (2013.01); *H04N 1/122* (2013.01); *H04N 1/1225* (2013.01); *H04N 2201/0081* (2013.01); *H04N 2201/0094* (2013.01)

(58) Field of Classification Search
CPC B65H 5/021; B65H 29/16; B65H 2404/2691; B65H 2801/39; H04N 1/0464; H04N 1/122
USPC ................................ 271/3.18, 4.06; 275/198
See application file for complete search history.

(56) References Cited

U.S. PATENT DOCUMENTS

| | | | | |
|---|---|---|---|---|
| 3,836,245 A * | 9/1974 | Hastwell | ............. | G03G 15/263 399/164 |
| 4,571,636 A * | 2/1986 | Itoh | ........................ | H04N 1/121 271/258.03 |
| 4,673,285 A * | 6/1987 | Shogren | ................. | G03B 27/52 355/23 |
| 4,734,742 A * | 3/1988 | Klumpp | ................. | G03B 27/48 355/23 |
| 4,743,974 A * | 5/1988 | Lockwood | ........... | H04N 1/1017 355/23 |
| 4,949,189 A * | 8/1990 | Ohmori | ................... | H04N 1/203 355/23 |
| 5,054,760 A * | 10/1991 | Reist | ...................... | B65H 29/16 198/600 |
| 5,203,553 A * | 4/1993 | Chiang | .................... | B65H 5/06 271/116 |
| 5,252,814 A * | 10/1993 | Tooley | ............... | G06K 7/10871 186/61 |

(Continued)

*Primary Examiner* — Ted W Barnes
(74) *Attorney, Agent, or Firm* — Fay Sharpe LLP

(57) ABSTRACT

A document scanning device includes first and second image sensors spaced along a document path and positioned to scan first and second sides of an input document. A first driven belt is configured to receive the input document directly onto a first surface of the first driven belt and transports the document past the first image sensor, where a first side of the document is scanned. A second driven belt, horizontally spaced from the first driven belt, receives the document after it has been scanned by the second image sensor and transports the document to an output. The device is suited to scanning of a variety of substrates and document sizes, such as normal, small, rigid, or delicate documents as the document path can be substantially straight and provide support for the document during scanning allowing delicate, small or rigid documents to be scanned.

18 Claims, 3 Drawing Sheets

(56) References Cited

U.S. PATENT DOCUMENTS

| | | | | |
|---|---|---|---|---|
| 5,298,937 A * | 3/1994 | Telle | H04N 1/00612 | |
| | | | 355/23 | |
| 6,069,681 A * | 5/2000 | Nakagawa | H04N 1/00588 | |
| | | | 355/23 | |
| 6,069,715 A | 5/2000 | Wang | | |
| 6,129,464 A * | 10/2000 | Nakamura | B41J 19/202 | |
| | | | 400/279 | |
| 6,856,423 B2 * | 2/2005 | Anderson | H04N 1/00803 | |
| | | | 358/1.12 | |
| 7,389,867 B2 * | 6/2008 | Hillmantel | B65G 47/244 | |
| | | | 198/395 | |
| 8,500,120 B2 * | 8/2013 | Mandel | B65H 7/20 | |
| | | | 271/265.02 | |
| 8,531,737 B2 * | 9/2013 | Kubo | H04N 1/00525 | |
| | | | 358/408 | |
| 8,556,181 B2 * | 10/2013 | Twiste | G07G 1/0045 | |
| | | | 235/470 | |
| 8,941,890 B2 * | 1/2015 | Kubo | H04N 1/00525 | |
| | | | 358/408 | |
| 8,947,748 B2 * | 2/2015 | Kubo | H04N 1/00525 | |
| | | | 358/408 | |
| 9,906,665 B1 * | 2/2018 | Philip | H04N 1/00588 | |
| 2005/0233881 A1 * | 10/2005 | Meyer | A61F 13/15764 | |
| | | | 493/405 | |
| 2008/0110724 A1 * | 5/2008 | Twiste | B65G 19/02 | |
| | | | 198/620 | |
| 2008/0225348 A1 * | 9/2008 | Kubo | H04N 1/00525 | |
| | | | 358/474 | |
| 2008/0240797 A1 * | 10/2008 | Ohmiya | G03G 15/0194 | |
| | | | 399/301 | |
| 2010/0263987 A1 * | 10/2010 | Meyer | A61F 13/15764 | |
| | | | 198/461.1 | |
| 2011/0043586 A1 * | 2/2011 | Silverbrook | B41J 3/60 | |
| | | | 347/104 | |
| 2012/0018520 A1 * | 1/2012 | Twiste | G07G 1/0045 | |
| | | | 235/470 | |
| 2012/0138687 A1 * | 6/2012 | Baitz | G06K 7/10871 | |
| | | | 235/470 | |
| 2012/0247924 A1 * | 10/2012 | Baitz | G07G 1/0045 | |
| | | | 198/606 | |
| 2013/0154181 A1 * | 6/2013 | Doan | B65H 43/00 | |
| | | | 271/109 | |
| 2014/0049002 A1 * | 2/2014 | Doan | B65H 43/00 | |
| | | | 271/240 | |
| 2014/0217668 A1 * | 8/2014 | Lotz | B65H 7/02 | |
| | | | 271/265.02 | |
| 2015/0197403 A1 * | 7/2015 | Moesli | B65G 47/31 | |
| | | | 198/464.4 | |
| 2017/0171417 A1 * | 6/2017 | Kasuga | G03G 15/5025 | |
| 2018/0084135 A1 * | 3/2018 | Kasuga | B08B 3/10 | |

* cited by examiner

DOCUMENT SCANNER

BACKGROUND

The exemplary embodiment relates to document scanners, such as are used in printers, copiers, and/or multifunction devices and, more particularly, to a belt driven document scanner suited to scanning of a variety of substrates and document sizes, such as normal, small, rigid, or delicate documents.

In existing printers and scanners, documents are generally fed through a document path using a series of driven rollers that transport the document from an input area and feed the document through a series of guides. The document is then scanned and output to an output tray. The document path from the input to output often includes several turns through the device. In the case of duplex scanning, the document path may flip the document after scanning of the first side in order to scan the second side of the document.

As such, existing scanners are limited to processing documents that are of appropriate size to be fed between sets of rollers and are capable of withstanding the stress of a complex document path. In the event that documents are small, rigid, or delicate, these systems are either incapable of operation or operate with significant risk of damage to the document.

There is a need for a two-sided document scanning device scanning for small, rigid, or delicate documents that are difficult to process with existing devices.

INCORPORATION BY REFERENCE

The following references, the disclosures of which are incorporated herein by reference in their entireties, are mentioned:

U.S. Pat. Nos. 6,069,715 and 5,298,937 describe document scanners.

BRIEF DESCRIPTION

In accordance with one aspect of the exemplary embodiment, a belt driven document scanning device includes a first and second image sensors spaced along a document path and positioned to scan first and second sides of an input document. A first driven belt receives the input document onto a first surface of the first driven belt and transports the document past the first image sensor. A second driven belt, horizontally spaced from the first driven belt, receives the document after it has been scanned by the second image sensor and transports the document to an output.

The exemplary belt driven document scanning device may further include a first backing member in contact with a second surface of the first belt to position the document to be scanned by the first image sensor and a second backing member which is in contact with the first side of the document (or a third belt) to position the document to be scanned by the second image sensor.

In accordance with another aspect of the exemplary embodiment, a method of scanning a document includes receiving a document to be scanned on a first driven belt, transporting the document along the first driven belt past a first image sensor which scans a first side of the document, receiving the document on a second driven belt after it has passed a second image sensor which scans a second side of the document, and outputting the document to an output receptacle.

In accordance with another aspect of the exemplary embodiment, a belt driven document scanning device includes first and second image sensors spaced along a horizontal document path and positioned to scan first and second sides of an input document. A first driven belt receives the input document directly onto a first surface of the first driven belt and transports the document past the first image sensor. A driven second belt transports the document to an output. A third belt extends across a gap between the first and second belts, and receives the document after it has been scanned by the second image sensor; the third belt being driven by contact with the second driven belt. First and second backing members, in contact with the first and third belts, respectively, position the document to be scanned by the first and second image sensors.

DETAILED DESCRIPTION

Aspects of the exemplary embodiment relate to a belt driven document scanning device suitable for processing a variety of documents, such as normal, small, rigid, and/or delicate documents and a method of using the same.

"Idler rollers," as used herein are rollers which are not driven by a drive mechanism, and do not drive a belt, but which can rotate through contact with a moving member, such as a belt or a document. "Belt rollers," as used herein, cause the belt which they are associated with to move along a continuous path.

Figure 1:
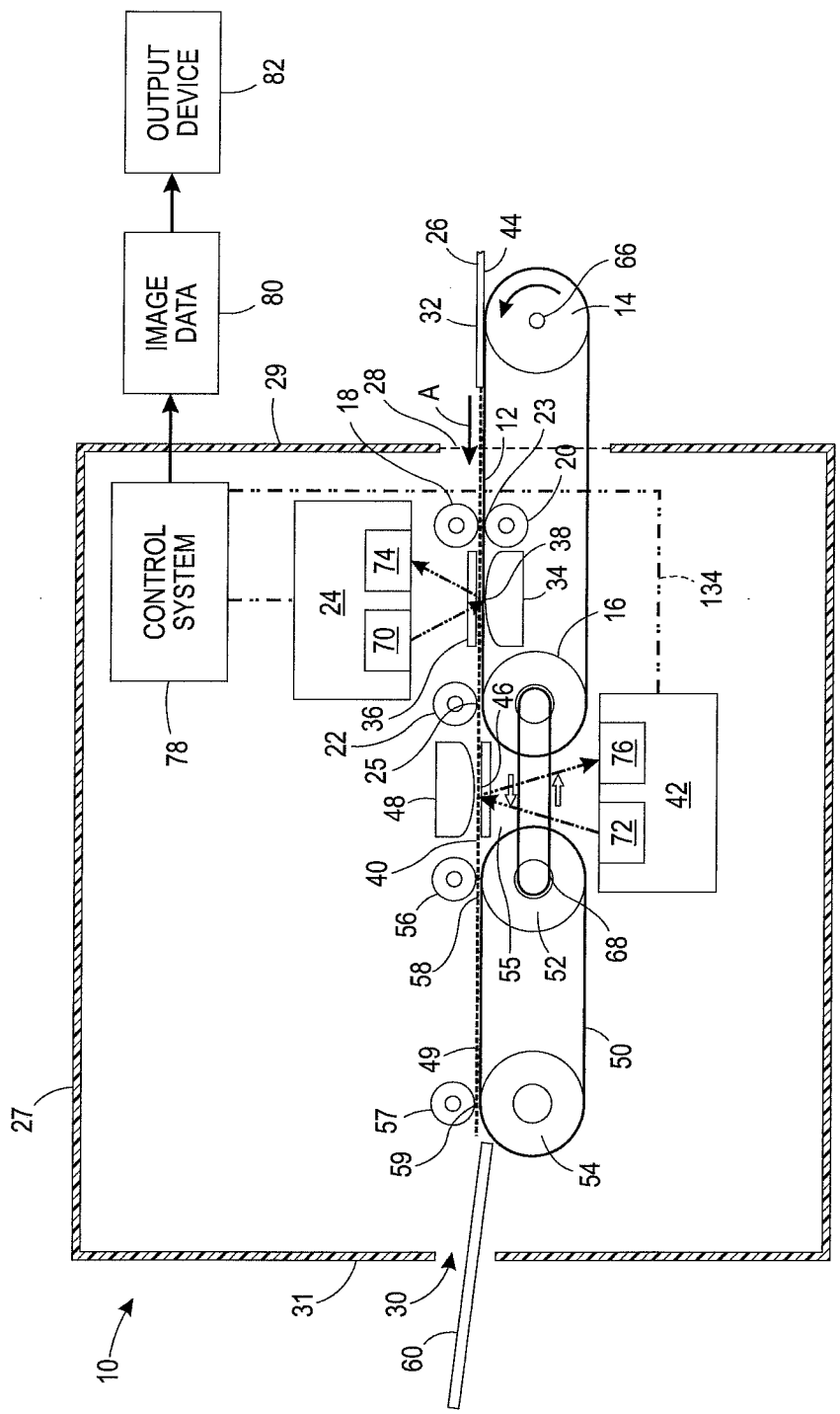
FIG. 1 illustrates a document scanning device in accordance with one aspect of the exemplary embodiment.

With reference to FIG. 1, a first embodiment of a scanning device 10 is shown. The scanning device 10 may form a part of a multifunction device which includes a printer and/or fax machine, or can be a stand-alone device.

The scanning device 10 includes a first driven belt 12 which is mounted on first and second belt rollers 14 and 16 which drive the belt in the direction of arrow A. Positioned along the first belt 12 are a series of idler rollers 18, 20, and 22. As the first belt 12 turns, rollers 18, 20, and 22 also turn. The idler rollers 18, 20 are positioned above and below the first belt 12, respectively, upstream of a first scan head 24. Belt rollers 18, 20 together define a first nip 23, through which the belt 12 and a document 26 pass, for guiding and positioning of the document while it is transported along the belt 12 towards the first scanning head 24. The third idler roller 22 is positioned above the belt 12, downstream of the rollers 18, 20 and first scanning head 24. The idler roller 22 and the second belt roller 16 together define a second nip 25, through which the belt 12 and document 26 pass before the document leaves the first belt 12. The idler rollers 18, 20, 22, may be sprung or otherwise biased towards the belt 12, so that they can accommodate various document thicknesses. As a document's thickness increases, the sprung idler rollers 18, 22, can move vertically so as to still form a contact with an upper side of the document.

The scanning device 10 includes a housing 27 which defines an inlet slot 28, at a first end 29 of the housing and an outlet slot 30 at a second, opposite end 31 of the housing. The first belt 12 may extend outwardly from the inlet slot 28 of the scanning device housing to accept documents 26 placed directly on the belt. Alternatively, it may accept documents through the slot 28, enabling the document to be fed through the slot and placed onto the belt. In some embodiments the exemplary scanning device is integrated with a conventional document feeder mechanism which drops documents onto the belt. Such a feeder mechanism may optionally be lifted or removed for direct access to the belt 12 for manual feeding of documents that are small, rigid, delicate, random size, or otherwise of a special form factor that benefits from the precaution of manual placement onto the belt surface.

The idler rollers 18, 20, 22, may be made of conventional materials, such as nylon or plastic. The first belt 12 may be made of conventional materials, such as neoprene rubber or plastic. The color of the material used in the first belt 12 may be selected to provide a color suitable to serve as a backing during the scanning process.

As the document moves along the first belt 12, it is scanned by the first scan head 24, which is positioned above the belt, to scan a first (upper) side 32 of the document 26. A first backing member 34, positioned on the underside of the first belt 12, forms a contact with the underside of belt 12 in order to stabilize the belt and position the document in a fixed vertical position, during the scanning process carried out by the first scan head 24. The first backing member 34 may be fixed in position, relative to the scan head 24, and be non-rotating. In other embodiments, the backing member 34 may be rotatable, such as an idler roller and/or biased upwardly, e.g., by a spring. The backing member 34 may be curved so as to avoid catching the moving belt and further facilitate movement thereof. The backing member 34 may be made of plastic or other suitable materials. Since it is not normal to have a transparent belt as it may be prone to contamination, the backing member may be any desired color, such as the same color as the belt. A first transparent scan platen 36 (e.g., a flat glass, or plastic plate) is interposed between the first scan head 24 and the belt 12, directly above the backing member 32. The first scan head 24 creates a scan of the first side 32 of the document while it passes through a first scanning position 38 in a gap between the platen 36 and the first belt 12. The highest point on the curved upper surface of the backing member 34 is vertically aligned with the first scanning position 38.

After the first side 32 of the document 26 has been scanned by the first scan head 24, the document is transported through the nip 25 between the third idler roller 22 and the second driven roller 16 onto a second transparent scan platen 40, which may be configured similarly to the first platen 36. A second scan head 42, positioned below the scan platen 40, creates a scan of a second (lower) side 44 of the document as the document is transported across the platen 40 through a second scanning position 46 in a gap between the platen 40 and a second backing member 48. The backing member 48 is similar to the first backing member but is positioned above the platen 40 and scan head 42. The backing member 48 may be curved to facilitate the document moving across the second scan platen 40 and avoid catching. The second backing member 48 may be fixed in position, relative to the scan head 42 and/or platen 40, and may be non-rotating. In other embodiments, the backing member 34 may be rotatable, such as an idler roller. The lowest point on the curved lower surface of the backing member 48 is vertically aligned with the second scanning position 46.

As can be seen from FIG. 1, the first and second scan heads 24, 42 are positioned on opposite sides of a document path 49 defined, in part, by the upper side of the belt 12 and the upper side of the platen 40. The document 26 is thus scanned on both sides 32, 44 without being flipped over between the two scanning positions 38, 46 reducing any likely damage. This also enables a straight paper path. Similarly, the backing members 34, 48 are positioned on opposite sides of the document path from each other, and also from their respective scan heads/sensors. An upper surface of the platen 40 and an upper surface of the belt 12 are substantially horizontally aligned, where they meet, so as to minimize bending of the document as it is transported along the document path 49.

The document 26 is moved across the second transparent scan platen 40 onto a driven second belt 50 which transports the document towards the outlet slot 30. The belt 50 rotates about third and fourth belt rollers 52 and 54, in a similar manner as the first belt 12. An upper surface of the second belt 50 forms a third portion of the document path 49 and is substantially horizontally aligned with the second platen 40, where the two meet, to maintain a substantially straight (e.g., horizontal) document path 49 through the housing 27. By "substantially straight", it is meant that the document is not flipped over between the first and second scan heads and is not bent around a significantly curved path (i.e., one in which any curves have a diameter of no less than the document length (length in the direction of motion), or no less than twice the document length, along the document path). In one embodiment, the upper surface of the platen 40 and the upper surface of the belts 50, 12 define an angle of 180°±no more than 15°, and/or are vertically spaced by no more than 2 mm, or no more than 1 mm, where they each meet. The platen 40 is positioned in a horizontal gap 55 between the second and third driven rollers 16, 52 and respective driven belts 12, 50. The platen 40 can be spaced from the belts 50, 12 on either side by narrow gaps, sufficient to avoid direct contact between the platen 40 and the belts, such no more than 1 cm, or no more than 0.5 cm.

Fourth and fifth idler rollers 56 and 57 are situated directly above belt rollers 52 and 54, to define respective third and fourth nips 58, 59 therebetween, through which the belt 50 and document 26 pass. The idler rollers 56, 57 may be fixed in a vertical position or they may be sprung or otherwise biased towards the second belt 50 to make contact with the belt 50 so that they roll with the belt and assist in moving the document along the second belt 50 as it moves away from the scan platen 40, in a similar manner to rollers 18, 22. As a document's thickness increases, the sprung idler rollers can move vertically so as to still form a contact with the upper side 32 of the document.

The second backing member 48 may be made of plastic or other suitable material. The color of the second backing member 48 may be selected to serve as a backing material for the document during the scanning process.

The horizontal gap 55 is sufficiently wide for the second scan head to scan the document lower surface 44 through the gap. However, the gap is sufficiently small that the width between the centers of the two rollers 16, 52, and their respective nips, is less than the smallest length of a document 26 to be scanned.

A document receptacle 60, such as an output tray, is positioned to receive the document 26 from the second belt 50, as it leaves the housing. The output tray 60 may be horizontally aligned with the document path 49 or angled slightly upward, at a shallow angle, as shown.

The first and second belts 12, 50 may be driven by a common drive system, as illustrated in FIG. 1. For example a drive motor 66 drives one of the belt rollers 14, 16, 52, 54, such as roller 14. A drive belt 68 connects rollers 16, 52. As the drive belt 68 turns in a counter-clockwise direction, the belts 12 and 50 are turned at a same or similar speed and in the same direction. In other embodiments, the first and second belts 12, 50 are driven by separate, independent motors.

The document 26 can include a substrate, such as paper, card, plastic, or other flexible or semi-rigid material, on which an image is formed on one or both sides.

The first and second scan heads 24, 42 each include a light source 70, 72, such as an LED light source, and an image sensor 74, 76, such as a Contact Image Sensor (CIS) or a Full Width Array Sensor (FWA). Sensors such as CIS and FWA function by receiving light reflected from the document and converting the light into electrical signals representing the intensity of the received light. The electrical signals are then transmitted to an electronic control system 78, including a processor and a memory, which performs image processing on the signals to generate image data 80 for forming an image. The image data may be output to an output device 82. The output device may be a display device, such as a CRT/LCD device, on which the image of the document is displayed, or a printer, with which the image is rendered on print media, such as paper, using colorant(s) such as inks or toners. Alternatively or additionally, the image data may be output to a memory storage device, such as a CD-ROM, flash memory, hard drive, or the like. The control system 78 may be included as part of the each scan head or be a shared device, as shown. The memory of the control system may be configured to perform image processing so as to prepare the image data obtained by the image sensor. The control system 78 may be configured to detect contrast between the scanned document and the surface of the belt 12/backing member 48 in order to crop the image to generate an image scan consisting only of the document material and no part of the belt surface. The electronic subsystem may be further configured to associate the images obtained from the first and second image sensors 74, 76 and combine the images into a single digital file. For single-sided, rather than duplex scanning of documents, the scan head 42 may be rendered inoperative or the image signals generated by it may be simply ignored.

Figure 2:
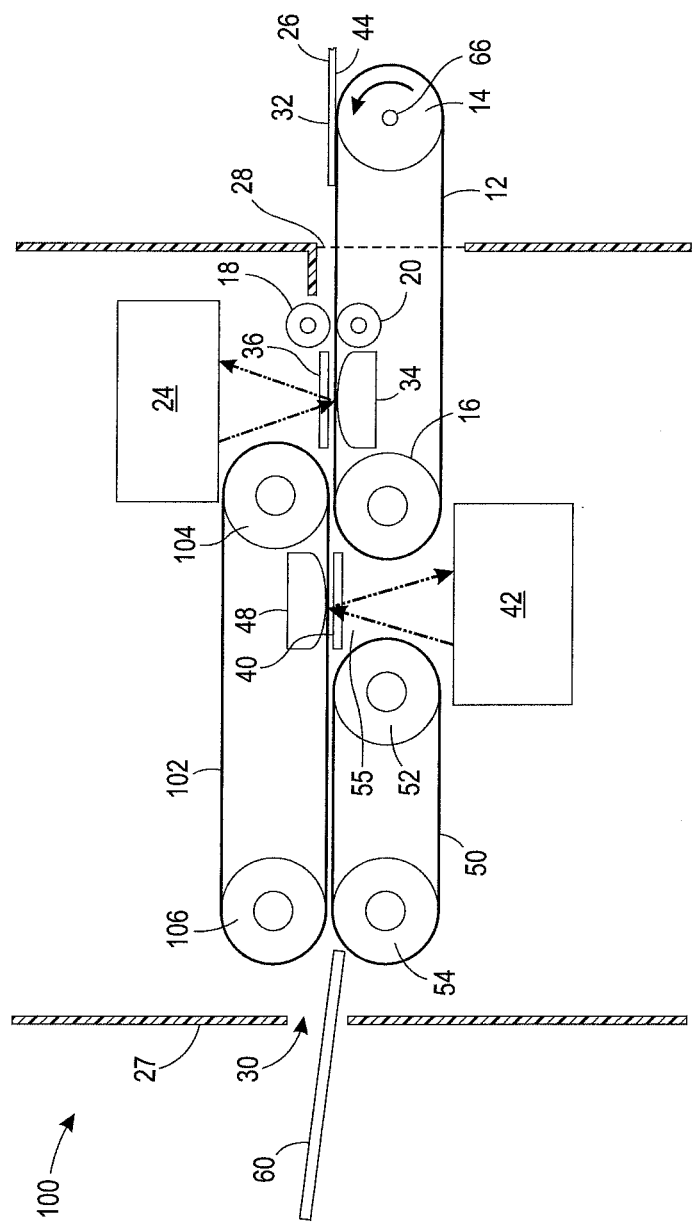
FIG. 2 illustrates a document scanning device in accordance with an alternative embodiment of the exemplary document scanning device and FIG. 3 illustrates a method of document scanning.

With reference to FIG. 2, another embodiment of a scanning device 100 is shown. The scanning device can be similarly configured to scanning device 10, except as noted. Similar components are accorded the same numerals and different components new numerals. The scanning device 100 includes a first belt 12 which rotates about belt rollers 14 and 16. Idler rollers 18 and 20 are positioned above and below the belt 12, respectively, to define a nip therebetween. The belt 12 may protrude from the housing 27 to accept documents placed directly on the belt or it may accept documents through an inlet slot 28.

After the first side of the document has been scanned by the first scan head 24, the document is contacted by a third belt 102 and moved across a second scan platen 40, where the second side of the document is scanned by a second scan head 42. The third belt 102 extends horizontally, across the horizontal gap 55 between the first and second belts 12, 52. This reduces the need to limit the width of the gap 55 between nips less than the minimum length of the documents to be processed, since the third belt 102 helps to transport the document across the platen 68.

The third belt 102 is free to rotate about fifth and sixth belt rollers 104 and 106. The belt roller 104 replaces the idler roller 22 used in the embodiment of FIG. 1. The third belt 102 may be driven by contact with the second belt 50, or vice versa. Belt roller 104 is positioned directly above and in contact with belt roller 16. This contact allows the first belt 12 to drive the third belt through contact alone. For example, the drive motor 66 drives the first belt 12, which in turn drives the third belt 102, through contact. Similarly, the third belt drives the second belt 50 through contact, obviating the need for a drive belt 68, as shown in FIG. 1. Alternatively or additionally, a drive belt may connect a pair of driven rollers, such as rollers 52, 16. The third belt 102 maintains contact with the upper side of the document and transports it across the second scan platen 40 to be scanned. The third belt 102 may be made from conventional materials such as neoprene rubber or plastic. The color of the materials in the belt 102 may be selected to serve as a backing during the scanning process.

In this embodiment, the second backing member 48 is spaced from the platen 40 by the third belt 102. The second backing member 48 contacts the inside surface of the belt 102 in order to stabilize the belt 102 during the scanning processes carried out by the second scan head 42. The backing member 48 may be curved so as to avoid catching the moving belt and further facilitate movement thereof. The color of the materials used in the backing member 48 may be selected to be suitable to serve as a backing during the scanning process in the event that light can penetrate the third belt 102.

The second and third belts 50, 102 make contact downstream of the second platen 40 to define a portion of the document path. After the second side of the document has been scanned by the second scan head 42, the second and third belts, traveling at the same speed and in the same direction where they contact, transport the document towards the outlet slot. The upper side of the document is contacted by the belt 102 while the underside is contacted by the belt 50. The document is transferred by these belts to an output tray 60.

As each belt 12, 50, 102 is turned by a single, common drive motor 66, the belts are each turned at a similar speed and direction.

Figure 3:
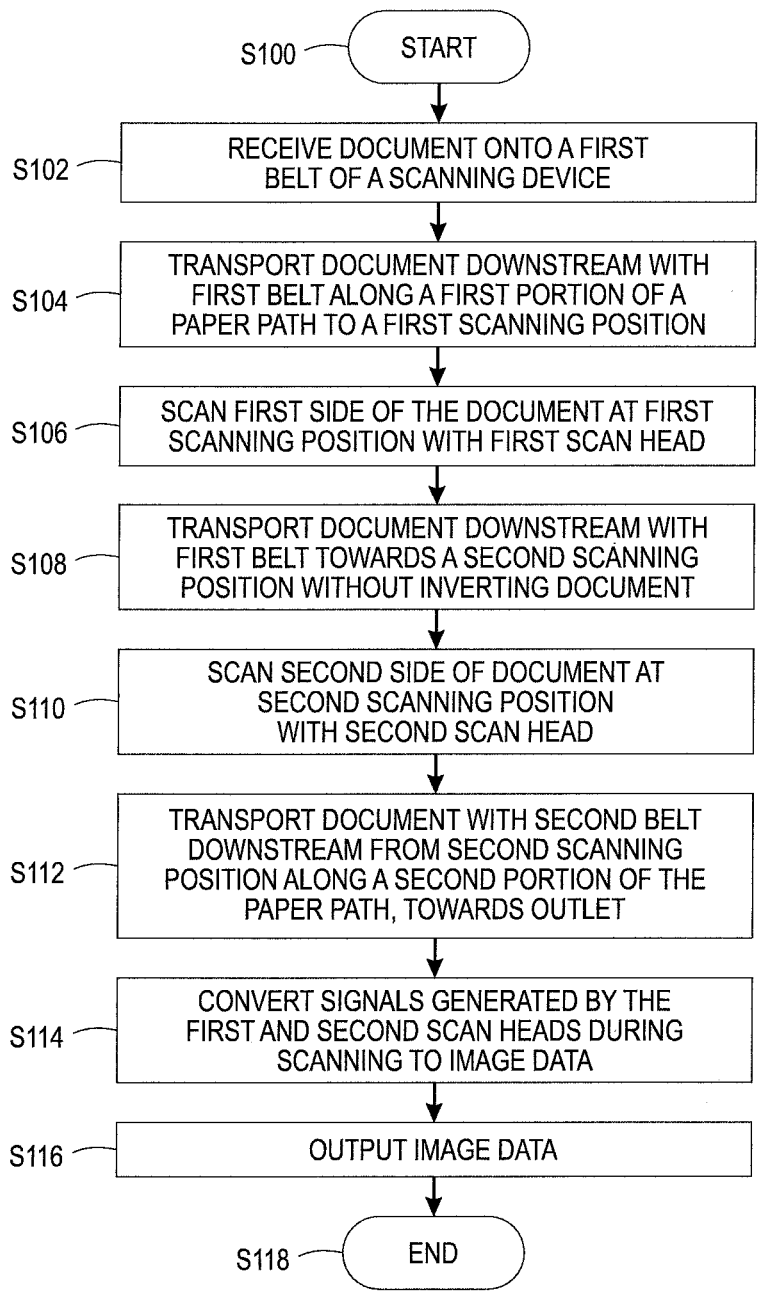

With reference to FIG. 3, a scanning method is illustrated. The method begins at S100.

At S102, a document 26 to be scanned on both sides 32, 44 is received onto a first belt 12 of a scanning device 10, 100.

At S104, the document is transported, horizontally downstream, by the first belt 12, along a first portion of a document path 49, to a first scanning position 38, where at S106, the first side 32 (only) of the document is scanned by a first scan head 24.

At S108, the document is transported, horizontally downstream, by the same, first belt 12 from the first scanning position towards a second scanning position 46, downstream of the first scanning position, without inverting the document, where at S110, the second side 44 (only) of the document is scanned by a second scan head 42 through a gap 55 between first and second driven belts 12, 50.

At S112, the document is transported by the second belt 50 (and optionally also by a third belt 102) horizontally, downstream from the second scanning position 46, along a second portion of the document path, towards an outlet 30 of the scanning device, where the document is output to an output receptacle 60.

At S114, signals generated by the first and second scan heads during scanning are converted to image data 80 corresponding to images of the first and second sides of the document, by a control system 78.

At S116, the image data is output by the scanning device 10, 100.

The method ends at S118.

The process may be repeated with one or more documents.

In the foregoing, terms such as "right," "left," "vertical," "horizontal," "top," "bottom," "upper," "lower," "under," "below," "underlying," "over," "overlying," "parallel," "perpendicular", etc., used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms "automated" or "automatically" mean that once a process is started (by a machine or a user), one or more machines perform the process without further input from any user.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A document scanning device, comprising:
   first and second image sensors spaced along a document path and positioned to scan first and second sides of an input document;
   a first driven belt which receives the input document onto a first surface of the first driven belt and transports the document past the first image sensor;
   a second driven belt, horizontally spaced from the first driven belt, which receives the document after it has been scanned by the second image sensor and transports the document to an output;
   a third driven belt, the second and third driven belts defining a portion of the document path between them, the third belt extending across a gap between the first and second belts, which receives the document after it has been scanned by the second image sensor; the third belt being driven by contact with the second driven belt, and
   a transparent scan platen positioned in the gap between the first driven belt and the second driven belt, an upper surface of the scan platen and an upper surface of the first belt being substantially horizontally aligned, the second image sensor being positioned below the transparent scan platen.

2. The document scanning device according to claim 1, further comprising a first backing member, on the underside of and adjacent the first belt, to assist in positioning the document to be scanned by the first image sensor.

3. The document scanning device according to claim 1, wherein the first and second image sensors are selected from full width array sensors and contact image sensors.

4. The document scanning device according to claim 1, further comprising at least one idler roller which maintains the document in contact with the first driven belt.

5. The document scanning device according to claim 4, wherein the at least one idler roller is sprung to move vertically.

6. The document scanning device according to claim 1, further comprising at least two idler rollers which maintain the document in contact with the first driven belt.

7. The document scanning device according to claim 1, wherein the first and second driven belts are driven by a same motor.

8. The document scanning device according to claim 1, further comprising at least one idler roller which maintains the document in contact with the second driven belt.

9. The document scanning device according to claim 8, wherein the at least one idler roller which maintains the document in contact with the second driven belt positions the document to be transferred to an output tray which receives the document.

10. The document scanning device according to claim 1, wherein the first and second image sensors are positioned on opposite sides of the document path.

11. The document scanning device according to claim 1, wherein the first and second portions of the document path are horizontally aligned.

12. The document scanning device according to claim 1, further comprising a control system which receives signals from the first and second image sensors and generates image data for the first and second sides of the document.

13. The document scanning device according to claim 1, further comprising a housing which houses the first and second image sensors, the first driven belt extending outwardly of the housing through an inlet slot of the housing.

14. A method of scanning a document, comprising:
    receiving a document to be scanned on a first driven belt;
    transporting the document along the first driven belt past a first image sensor which scans a first side of the document;
    transporting the document across a gap between the first driven belt and the second driven belt, a transparent scan platen positioned in the gap, an upper surface of the scan platen and an upper surface of the first belt being substantially horizontally aligned, the second image sensor being positioned below the transparent scan platen;
    receiving the document on a second driven belt after it has passed a second image sensor which scans a second side of the document the second driven belt and a third driven belt defining a portion of the document path between them, the third belt extending across a gap between the first and second belts, the third belt being driven by contact with the second driven belt; and
    outputting the document on to an output receptacle.

15. The method according to claim 14, further comprising providing a first backing member for assisting in positioning the document while the document is transported past the first image sensor.

16. The method according to claim 14, further comprising providing a second backing member for assisting in positioning the document while the document is transported past the second image sensor.

17. A document scanning device, comprising:
    first and second image sensors spaced along a horizontal document path and positioned to scan first and second sides of an input document;
    a first driven belt which receives the input document directly onto a first surface of the first driven belt and transports the document past the first image sensor;
    a second driven belt which transports the document to an output;
    a third belt which extends across a gap between the first and second belts, receives the document after it has been scanned by the second image sensor; the third belt being driven by contact with the second driven belt; and first and second backing members, in contact with the first and third belts, respectively, for positioning the document to be scanned by the first and second image sensors.

18. The document scanning device according to claim 17, wherein the second belt is driven by the same motor as the first belt.

\* \* \* \* \*